July 11, 1939.   J. M. SAULS   2,165,874
VALVE
Filed Dec. 1, 1937   2 Sheets-Sheet 2
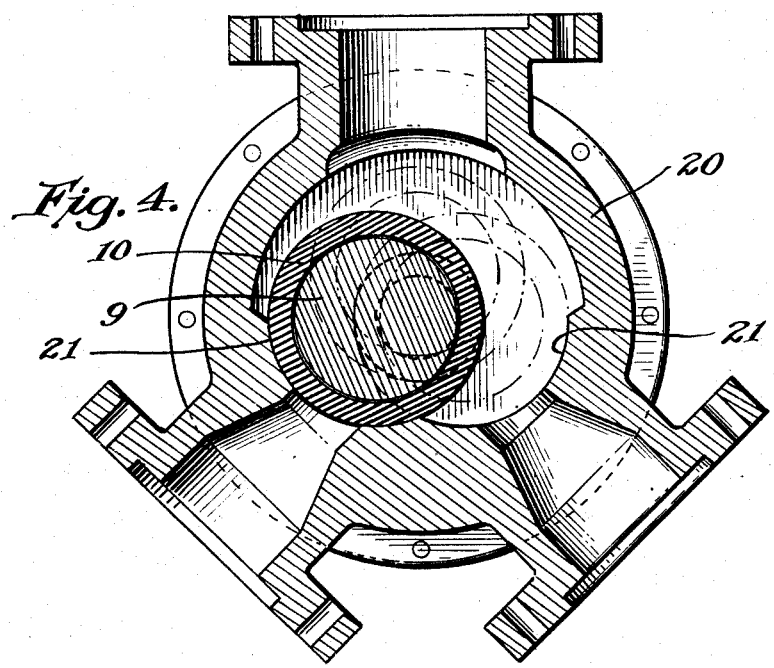
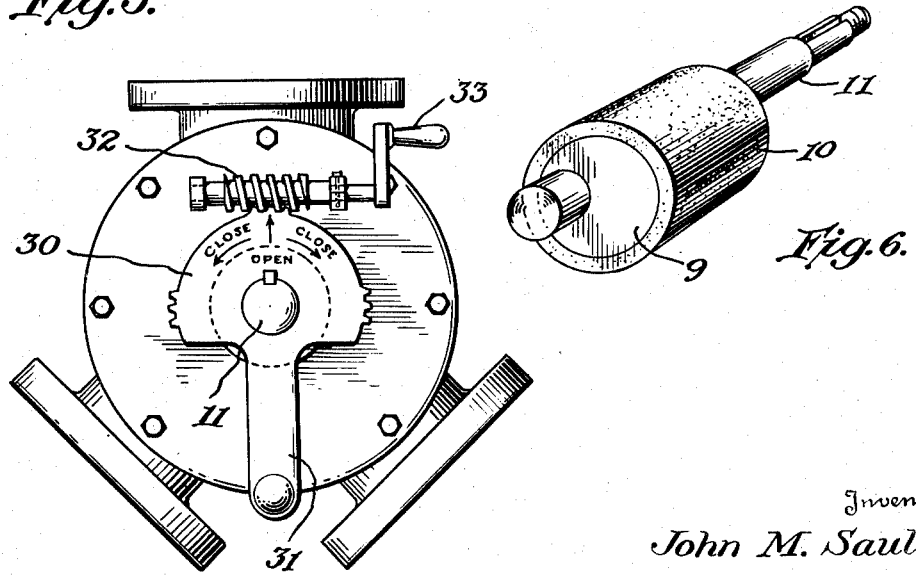
Inventor
John M. Sauls
By Eccleston & Eccleston,
Attorneys Patented July 11, 1939

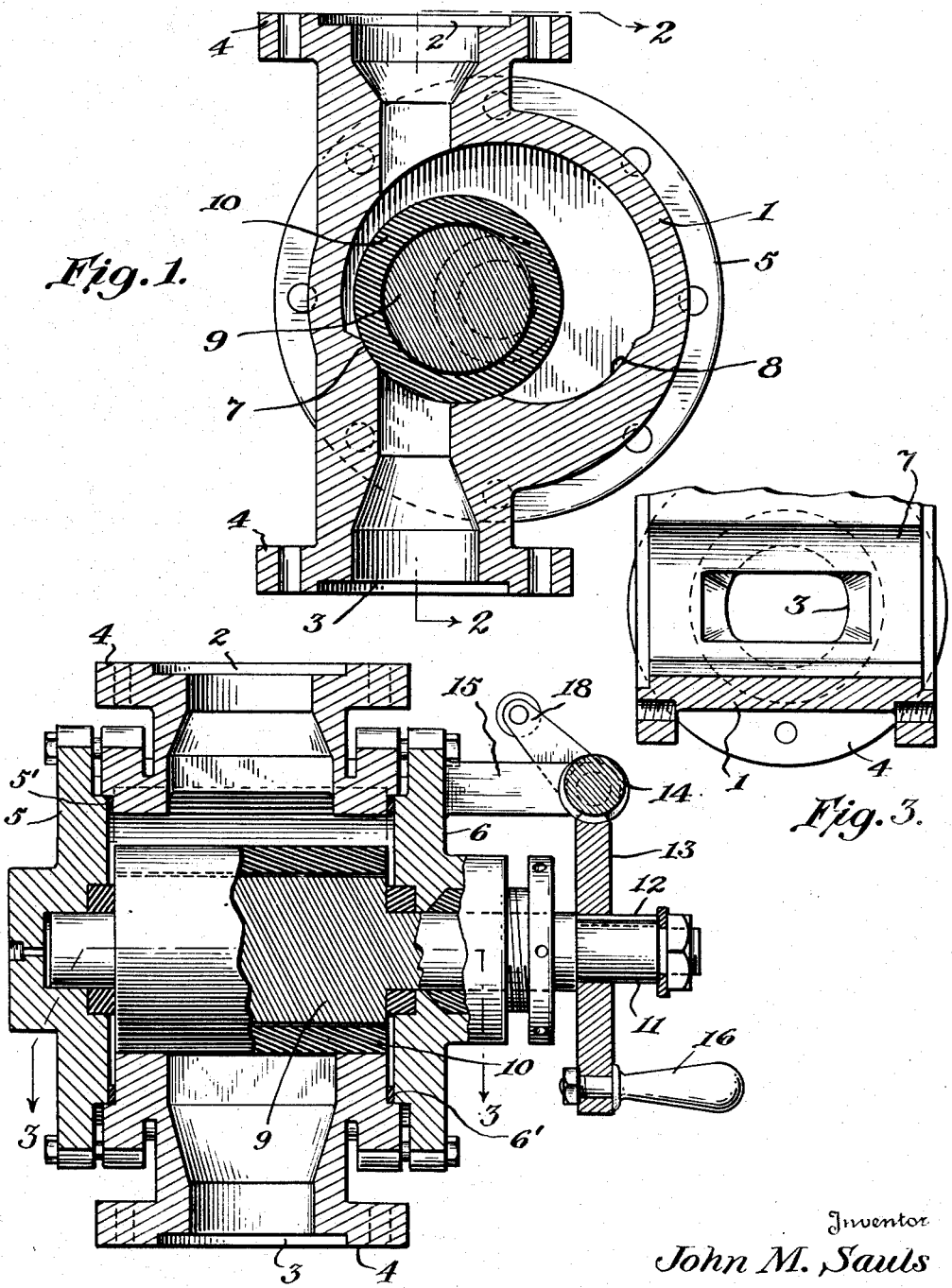

2,165,874

UNITED STATES PATENT OFFICE 2,165,874

VALVE

John M. Sauls, Oklahoma City, Okla.

Application December 1, 1937, Serial No. 177,571

7 Claims. (Cl. 251—125)

This invention relates to valves for use in lines having either high or low pressures, but is especially designed for the purpose of controlling pressures in oil well apparatus.

A primary object of the invention resides in the provision of a valve having a valve body of cylindrical form for closing a rectangular passageway.

A further object of the invention consists in the provision of a valve body which is eccentrically mounted so that by mere oscillation about a pivot it may be moved to either open or closed position.

Another object of the invention resides in the provision of a loosely mounted bushing on the valve body whereby the bushing is allowed to move about the body and thus avoid undue wear in particular spots.

A further object of the invention consists in providing a raised valve seat, the area of which may be varied so as to control the amount of pressure required to hold the valve upon its seat.

Other objects and advantages of the invention will be apparent from the following description when taken in connection with the accompanying drawings, in which, Figure 1 is a transverse section through one form of valve embodying the present invention.

Figure 2 is a sectional view taken on line 2—2 of Figure 1.

Figure 3 is a fragmentary sectional view taken on line 3—3 of Figure 2, with the valve body removed.

Figure 4 is a sectional view of a three-way valve embodying the present improvements.

Figure 5 is an end elevational view of the valve of Figure 4, and,

Figure 6 is a perspective view of the valve body and bushing.

Referring to the drawings in greater detail and particularly to Figures 1, 2 and 3, the numeral 1 indicates a valve casing provided with entrance and exit passages 2 and 3 and attaching flanges 4 for the usual pipe connections.

The casing 1 is of cylindrical form and provided with heads 5 and 6 secured thereto in any preferred manner. Gaskets 5' and 6' are preferably disposed between the heads 5 and 6 and the casing to preclude the entrance of sand or the like into the casing. On the interior of the casing a valve seat 7 is formed and adjacent thereto is a rest or support 8 for the valve when in open position. The valve seat itself is of rectangular shape (see Fig. 3), but the passageway is changed to round as it leaves the casing and therefore can be provided with threads, if desired, for threaded engagement with a pipe line. The valve seat 7 is formed on a raised portion of the inner wall of the casing, as is also the support or rest portion 8.

Each of the parts 7 and 8 is struck on an arc of a circle the radius of which corresponds with the radius of the valve body. This valve body is of cylindrical form and comprises a cylindrical member 9 of metal and a cylindrical bushing 10 surrounding the same. The bushing 10 may be composed of rubber, leather or composition, and is loosely mounted on the body 9. By thus loosely mounting the bushing it is free to move around the valve body and such movement will be caused by the opening and closing of the valve and by fluid pressure exerted thereon. This variation of the position of the bushing is of importance in that it changes its point of contact with the valve seat and thereby prevents it from becoming worn in spots.

The valve body 9 is eccentrically mounted on a shaft 11, one end of the shaft being seated in a bearing in the head 5 and the other end thereof extending through a bearing in the head 6. Both of these bearings are, of course, to be suitably lubricated, any preferred means being employed for that purpose.

Slidably mounted on shaft 11, as by means of key 12 is a worm wheel 13 adapted to mesh with a worm 14 mounted in bearings on a bracket 15 extending outwardly from the valve casing. The wheel 13, which is provided with an operating handle 16, may be moved out of mesh with worm 14 by sliding the former towards the outer end of the shaft 11, a nut 17 serving to limit the sliding movement of the wheel. The worm 14 is provided with a crank 18, and it will be obvious that the valve body 9 may be rocked about its pivot either by operating the worm 14 and through it the worm wheel 13, or by operating the worm wheel directly through its handle 16 after disengaging it from the worm 14. As will be understood, the worm is intended for use when considerable power is necessary as when moving the valve 9 to or from its seat when subjected to considerable pressure, while the wheel 13 is directly used under conditions where quick action rather than great power is essential. Moreover, with the worm disengaged it is possible to allow the valve to open and close automatically, especially in the valve construction shown in Figure 4.

The valve construction shown in Figures 4 and 5 is substantially the same as that heretofore described, except that a three-way rather than a two-way casing is employed, and the valve actuating mechanism is somewhat different.

In this form of the invention the cylindrical casing is indicated by the numeral 20 and the valve seats by the numeral 21. It will be noted that the seats 21 are substantially wider than those shown in Figures 1, 2 and 3, but in other respects they are the same, that is, they are of rectangular outline, they are raised above the general outline of the interior of the casing, and are struck on an arc corresponding to the curvature of the valve body 9—10.

Valves of this type are particularly useful in oil field work, in connection with pumps and vibrating lines. In such installations it is desirable that the valve body be retained firmly upon its seat, and in order that this may be easily accomplished it will be noted that the rim of the valve seat is substantially wider in Figure 4 than in Figure 1. By this increase in the width of the seat it will be apparent that the pressure in the valve casing will be more effective in retaining the valve on its seat.

The mechanism for actuating the valve of Figure 4 is somewhat different from that heretofore described, although it is designed to accomplish the same results. Fixed to the shaft 11 of the valve body is a mutilated worm wheel 30 provided with an operating handle 31. Mounted on the valve casing above wheel 30 is a worm 32 provided with a hand crank 33. By reason of the plain surfaces on the wheel 30 between the three sets of teeth it will be apparent that in certain positions of the valve body it may be operated directly by the handle 31, while in other positions thereof it must be operated by the worm 32. By the indicia appearing on the wheel 30 it will be noted that the intermediate series of teeth interlock with the worm to secure the valve body in neutral or open position, while the end series of teeth cooperate with the worm to move the valve body to final position on either of its seats or to initiate the raising of the valve body from either of its seats. It will be apparent therefore that, as in the previously described actuator, quick movement of the valve may be accomplished by direct operation of the worm wheel, and when extra power is required, as when initiating the opening of the valve or when closing or locking the valve in open position, the worm 32 may be placed in use.

The purposes and functions of the apparatus have been disclosed in connection with the detailed description thereof and need not be repeated, other than to note its simplicity of construction and operation.

From the foregoing description and the accompanying drawings it will be apparent to those skilled in the art that I have devised a valve of general application which is also especially adapted to use around oil fields, that it is of strong and durable construction as is necessary for such uses, that the valve bushing is so designed and mounted as to prevent undue wear at particular points, and that by the provision of the raised valve seats their surface area may be varied in different installations as necessity may require.

In accordance with the patent statutes I have described what I now believe to be the preferred forms of construction but inasmuch as various changes may be made in structural details without departing from the spirit of the invention it is intended that such changes be included within the scope of the appended claims.

What I claim is:

1. A valve including a substantially cylindrical casing, adjacently arranged arcuate valve seats in the casing, a completely cylindrical valve body in the casing having a radius of curvature corresponding to that of the arcuate valve seats, means for pivotally mounting the valve body at a point laterally offset from the center of curvature of either of said valve seats, and means for moving the valve body into cooperative relation with either of said seats.

2. A valve including a substantially cylindrical casing provided with passageways leading to and from the interior thereof, an arcuate valve seat on the interior of said casing and surrounding one of said passageways, a completely cylindrical valve body within the casing having a radius of curvature corresponding to that of the arcuate valve seat, and means for eccentrically mounting the valve body at a point laterally offset from the center of curvature of the valve seat.

3. A valve including a valve casing provided with an opening, an arcuate valve seat on the interior of said casing and surrounding the opening, a completely cylindrical valve body within the casing having a radius of curvature corresponding to that of the arcuate valve seat, and means for movably mounting the valve body at a point laterally offset from the center of curvature of the valve seat.

4. A valve including a casing, said casing provided with a rectangular opening, a rectangular arcuate valve seat on the interior of said casing and surrounding the opening, a completely cylindrical valve body within the casing having a radius of curvature corresponding to that of the arcuate valve seat, and means for movably mounting the valve body at a point laterally offset from the center of curvature of the valve seat.

5. A valve including a casing, said casing provided with an opening, a raised valve seat on the interior of said casing and surrounding the opening, said valve seat struck on an arc of a circle, a completely cylindrical valve body within the casing having a radius corresponding to that of the arcuate valve seat, and means for pivotally mounting the valve body at a point laterally offset from the center of curvature of the arcuate valve seat.

6. A valve including a valve casing provided with an opening, an arcuate valve seat on the interior of said casing and surrounding the opening, a completely cylindrical valve body within the casing comprising a central member and a surrounding cylindrical bushing loosely mounted on the central member, said bushing having a radius of curvature corresponding to that of the arcuate valve seat, and means for movably mounting the valve body at a point laterally offset from the center of curvature of the valve seat.

7. A valve including a casing, an arcuately arranged valve seat in said casing, an arcuately arranged rest at one side of the valve seat for supporting the valve body in inoperative position, a cylindrical valve body having a radius of curvature corresponding to that of the valve seat and means for movably mounting the valve body at a point laterally offset from the center of curvature of the valve seat.

JOHN M. SAULS.